Patented Feb. 11, 1936

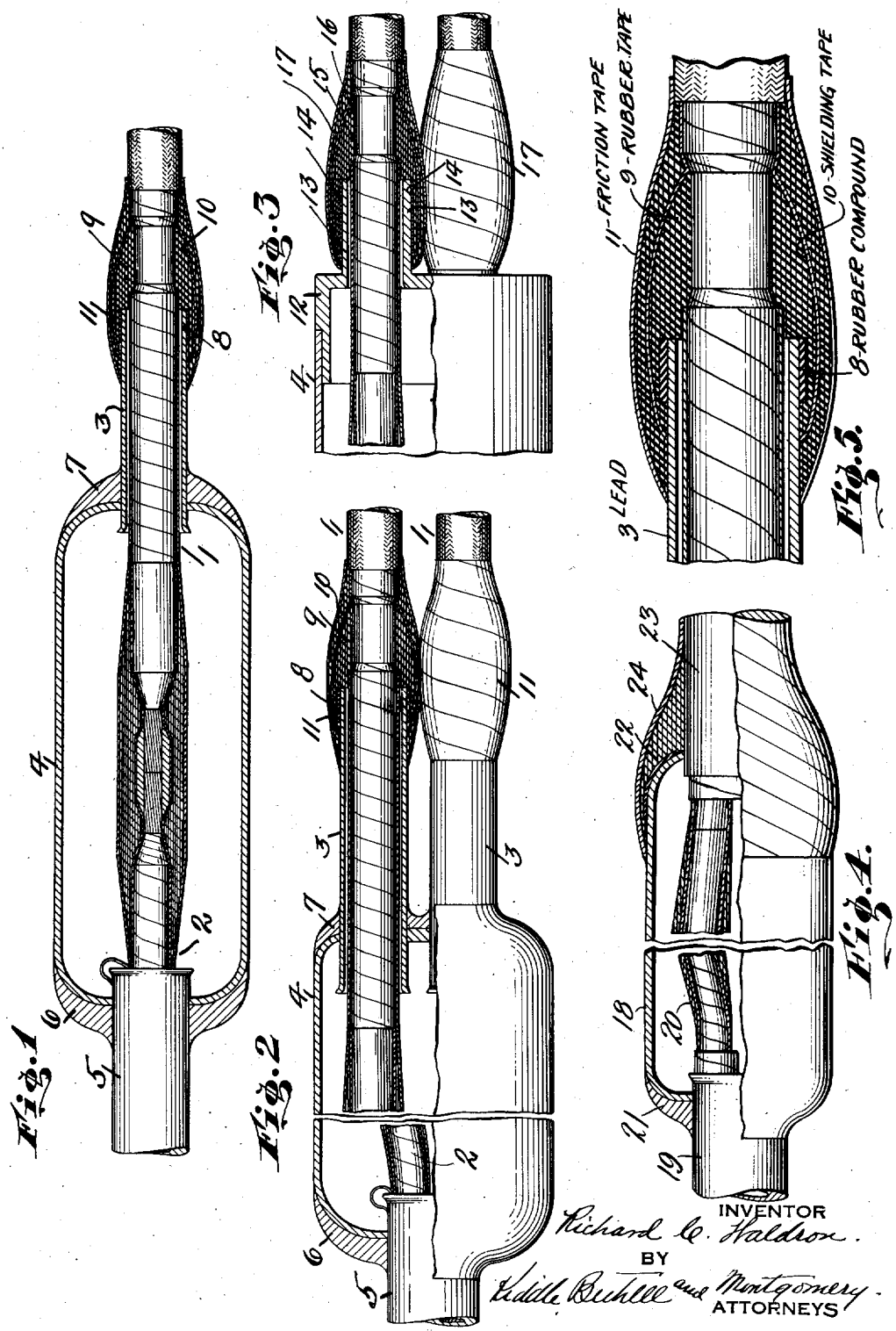

2,030,080

UNITED STATES PATENT OFFICE 2,030,080

CABLE SPLICE

Richard C. Waldron, Clifton, N. J., assignor to The Okonite Company, Passaic, N. J., a corporation of New Jersey Application June 8, 1934, Serial No. 729,586

4 Claims. (Cl. 173—268)

This invention relates to the splicing of non-metallic sheathed cables to metallic sheathed cables such as paper insulated, oil impregnated, lead covered cables, and has for one of its objects the provision of a splice which will be water-tight so as to prevent the entrance of moisture into the paper insulated cable.

It has been suggested heretofore to slip a short lead tube over the end of the non-metallic cable, the splice then being made up as with two paper insulated cables, and the usual lead sleeve which is slipped over this tube and the metallic sheathed cable, wiped to the lead sheath of the paper cable and to the lead tube. A moisture seal, however, is obviously necessary at the end of the lead tube remote from the wiped joint, between the lead tube and the non-metallic sheathed cable.

My invention provides for a water-tight joint or seal between the lead tube and the non-metallic sheathed cable, without the use of special equipment and for that matter without involving any expense in excess of that incurred in the inferior methods which have been suggested heretofore such as by simply wrapping rubber tape about the joint.

In the drawing accompanying this application I have shown several embodiments of my invention.

Fig. 1 is a part sectional elevational view of one embodiment of the invention;

Figs. 2, 3 and 4 are similar views of modifications; and

Fig. 5 is an enlarged view of the right hand end of the splice shown in Fig. 1.

Referring first of all to the embodiment of the invention as illustrated in Fig. 1. In this figure of the drawing the conductor of a braid covered cable 1 is spliced to the conductor of a lead sheathed cable 2 in the usual way, a lead tube 3 being first slipped over the non-metallic sheathed cable. The usual lead sleeve 4 is then wiped to the sheath 5 of the metal sheathed cable, as shown at 6, and to the lead tube 3 as shown at 7.

On the outer end of the lead tube 3 is moulded a rubber compound 8 which is vulcanized in place, this work being done at the factory. I then proceed to seal the outer end of the tube 3 to the non-metallic sheathed cable 1 by taping with rubber tape 9, between the cable and the rubber compound 8 on the tube. Shielding tape 10 is applied over the rubber tape 9, and friction tape 11 over the shielding tape for mechanical protection. The shielding tape 10 is preferably extended to beyond the end of the tube 3 to make an overlapped shield.

The embodiment of the invention as illustrated in Fig. 2 is directed to multi-conductor cables, where a plurality of non-metallic sheathed cables are spliced to a multi-conductor metallic sheathed cable. Inasmuch as the same method is employed in this embodiment of the invention as in Fig. 1 it is thought no further description is necessary, the same reference characters having been applied to this figure as to Fig. 1.

In Fig. 3 I have substituted a metal flange or casting 12, having nipples 13 for the tubes 3 of Fig. 1, for example. Each of the nipples 13 has a rubber compound 14 thereon the same as the compound 8 of Figs 1 and 2, and a moisture proof seal is provided by taping with rubber tape 15, applying shielding tape 16 over this tape 15 and then friction tape 17 over all for mechanical protection.

In Fig. 4 I employ a lead sleeve 18 which corresponds to the sleeve 4 of Fig. 1. One end of this sleeve is wiped to the metal sheath 19 of a metallic sheathed cable 20, as shown at 21, while at the other end this sleeve is provided with a vulcanized rubber compound 22 similar to the compound 8 of Fig. 1. A moisture proof seal is provided at this end of the splice to a rubber insulated cable 23, by the application of rubber tape and/or friction tape 24.

It is to be understood that the means of making up the moisture proof seal may be varied considerably from the several methods shown, the essential being that a rubber compound be moulded on the end of the metal constituting the end of the splice which is to be connected to the non-metallic sheathed cable.

What I claim is:—

1. In splicing metallic sheathed cables to non-metallic sheathed cables the method which comprises vulcanizing a rubber compound to one end of a metallic casing, applying this casing to the cables to be joined, wiping the end of said casing, remote from the rubber compound, to the sheath of the metallic-sheathed cable, and at the end of the casing to which the rubber compound is vulcanized making up a moisture proof seal between the rubber compound and the non-metallic sheathed cable.

2. In a splice between a metallic sheathed cable and a non-metallic sheathed cable, the combination of a metal casing for receiving the cables, a wipe joint between one end of said casing and the sheath of the metallic sheathed casing, a layer of rubber compound vulcanized to the opposite end of said casing, and a built up moisture proof seal comprising rubber tape wrapped about the non-metallic sheathed cable and said rubber compound.

3. In a splice between a metallic sheathed cable and a non-metallic sheathed cable, the combination of a metal casing surrounding the cables, a wiped joint between one end of the casing and the sheath of the first mentioned cable, rubber compound vulcanized to the opposite end of said casing, and rubber tape wrapped about the second mentioned cable and said rubber compound to provide a moisture proof seal.

4. In a splice between a metallic sheathed cable and a non-metallic sheathed cable, the combination of a metal casing surrounding the cables, one end of said casing being wiped to the metal sheath of the first mentioned cable, a metal tube surrounding the non-metallic sheathed cable and wiped to said casing, a rubber compound vulcanized upon the outer end of said tube, and a rubber tape wrapped about the non-metallic sheathed cable and said rubber compound to provide a moisture-proof seal between the last mentioned cable and said tube.

RICHARD C. WALDRON.